US012485527B2

(12) United States Patent
Huang et al.

(10) Patent No.: US 12,485,527 B2
(45) Date of Patent: Dec. 2, 2025

(54) FOLDABLE LYING CREEPER

(71) Applicant: HIEVER CO., LTD., Taichung (TW)

(72) Inventors: Tony Huang, Taichung (TW); Jeffery Huang, Taichung (TW)

(73) Assignee: HIEVER CO., LTD., Taichung (TW)

( * ) Notice: Subject to any disclaimer, the term of this patent is extended or adjusted under 35 U.S.C. 154(b) by 364 days.

(21) Appl. No.: 18/206,790

(22) Filed: Jun. 7, 2023

(65) Prior Publication Data

US 2024/0399562 A1 Dec. 5, 2024

(30) Foreign Application Priority Data

May 30, 2023 (TW) ................................ 112205427

(51) Int. Cl.
*B25H 5/00* (2006.01)

(52) U.S. Cl.
CPC ..................................... *B25H 5/00* (2013.01)

(58) Field of Classification Search
CPC ........................................................ B25H 5/00
See application file for complete search history.

(56) References Cited

U.S. PATENT DOCUMENTS 3,677,569 A * 7/1972 Larson ...................... B62B 3/02 280/32.6
RE35,732 E * 2/1998 Shockley ................. B25H 5/00 280/32.6
5,895,062 A * 4/1999 Miles ....................... B25H 5/00 280/32.6
5,947,489 A * 9/1999 Tucker ..................... B25H 5/00 280/32.6
6,095,532 A * 8/2000 Martin ..................... B25H 5/00 280/30
8,505,138 B1 * 8/2013 Minichiello ........... A47C 16/00 280/32.6
9,061,413 B2 * 6/2015 Huang ..................... B25H 5/00
9,486,914 B1 * 11/2016 Frolander ................ B25H 5/00
10,549,418 B1 * 2/2020 Cook ........................ B25H 5/00
10,604,169 B1 * 3/2020 Lane ........................ B25H 3/06
10,875,560 B2 * 12/2020 Frolander ................. B62B 5/08
11,234,529 B1 * 2/2022 Edwards ................ A47C 9/027
11,858,117 B2 * 1/2024 Huang ..................... B25H 5/00
2004/0227313 A1 * 11/2004 Shockley ................. B25H 5/00 280/32.6
2011/0049822 A1 * 3/2011 Hinman ................... B25H 5/00 280/32.6

* cited by examiner

*Primary Examiner* — James M Dolak
(74) *Attorney, Agent, or Firm* — Birch, Stewart, Kolasch & Birch, LLP

(57) ABSTRACT

A foldable lying creeper includes a first bench part and a second bench part, and the first and second bench parts are hinged on one side so that the first and second bench parts can be folded close to each other. The second bench part is convexly provided with a short wall. When the first and second bench parts are unfolded and flattened, the short wall can touch the upper edge of a frame below the first bench part to increase the supporting force between the first and second bench parts.

7 Claims, 10 Drawing Sheets

FOLDABLE LYING CREEPER

BACKGROUND OF THE INVENTION

1. Field of the Invention

The present invention relates to the lying creeper, especially a foldable lying creeper.

2. Description of the Related Art

It is often necessary to use a lying creeper when performing maintenance on many household items. However, most of the general lying creepers have a fixed size and cannot be folded, so the storage of the lying creeper is a problem when not in use.

SUMMARY OF THE INVENTION

The present invention has been accomplished under the circumstances in view. It is the main object of the present invention to provide a foldable lying creeper that is easy to operate and easy to carry and store.

To achieve the above main object of the present invention, the foldable lying creeper comprises, a first bench part, a second bench part, and a stand. The first bench part comprises a lying board and a frame arranged on the bottom surface of the lying board of the first bench part. The frame of the first bench part is provided with a plurality of pillars at the bottom surface of one side thereof. The second bench part comprises a lying board and a frame arranged on the bottom surface of the lying board of the second bench part. The frame of the first bench part and the frame of the second bench part are pivotally connected to each other on one side, so that the first bench part and the second bench part can be folded and stored or unfolded. The frame of the second bench part is protruded with a short wall at one side thereof adjacent to the frame of the first bench part, so that when the first bench part and the second bench part are unfolded and flattened, the short wall abuts an upper edge of the frame of the first bench part. The stand comprises a pivot seat, a support column and a support foot. The pivot seat is arranged on the bottom surface of the second bench part away from the first bench part. The support column is pivotally connected to the pivot seat. The support foot is connected to the support column. The support column can swing relative to the pivot seat between a folded position and an unfolded position.

Preferably, the frame of the first bench part has one side thereof provided with a hook, and the frame of the second bench part is provided with a buckle at the position corresponding to the hook.

Preferably, the frame of the first bench part is further provided with a fixing member, and the frame of the second bench part is further provided with a ring hook at the position corresponding to the fixing member.

DETAILED DESCRIPTION OF THE INVENTION

Figure 1:
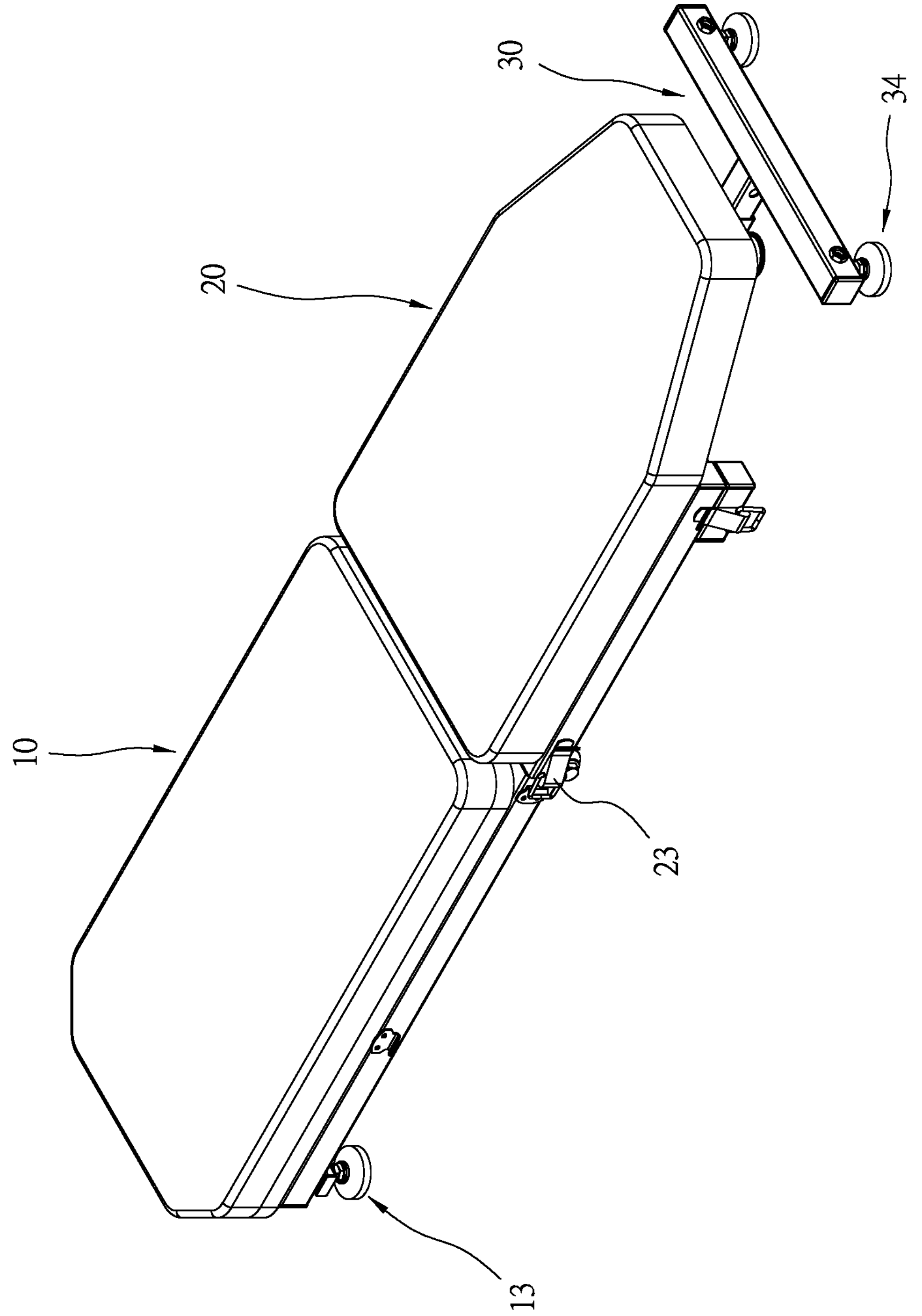
FIG. 1 is a three-dimensional schematic diagram of the present invention.
Figure 2:
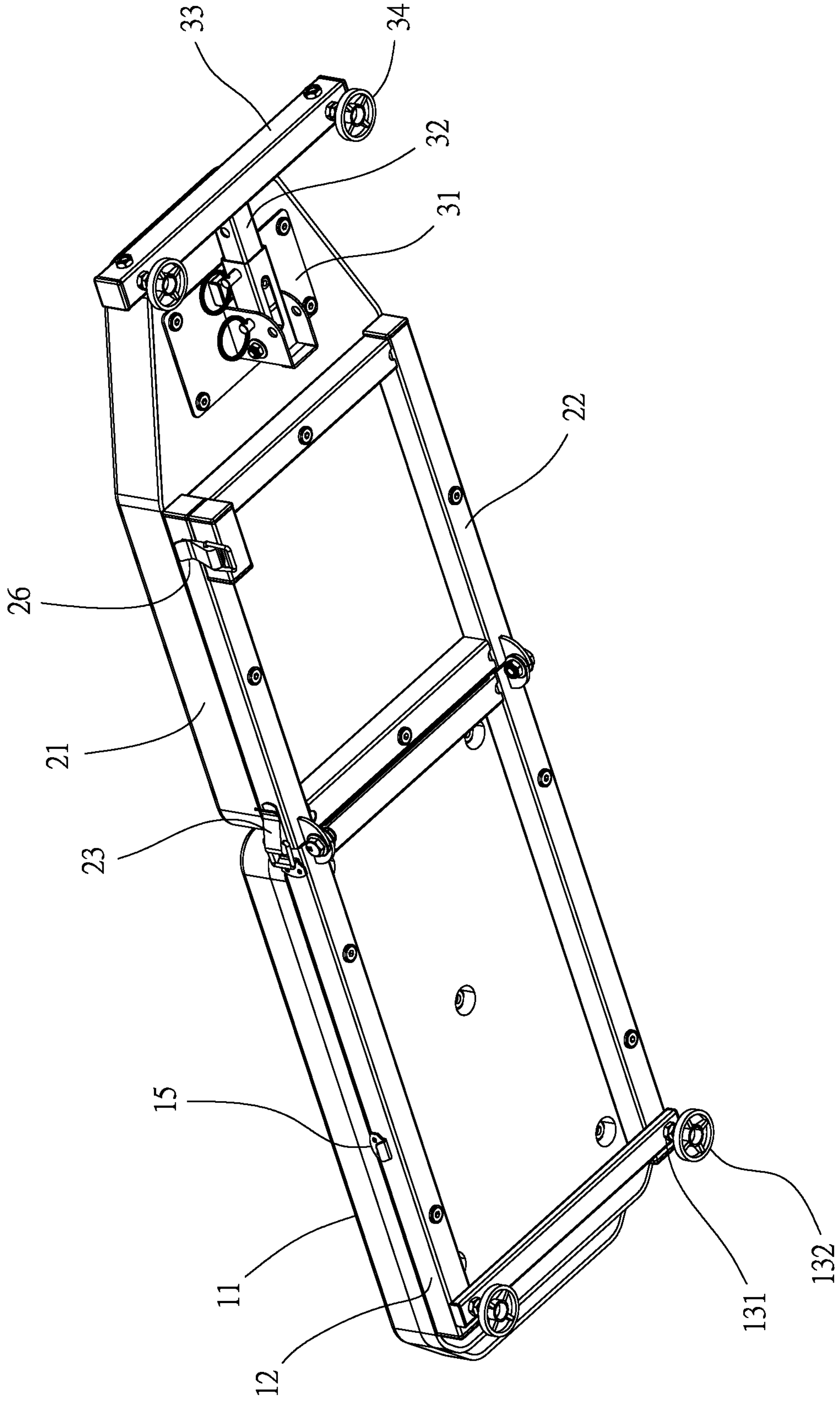
FIG. 2 is a perspective view of another angle of the present invention.

The applicant first explains here that in the entire specification, including the embodiment described below and the claims of the scope of the patent application, the nouns related to direction are based on the directions in the drawings. Secondly, in the embodiment and drawings to be described below, the same component numbers represent the same or similar components or their structural features.]

Please refer to FIGS. 1-5, which shows that the foldable lying creeper of the present invention comprises: a first bench part 10, a second bench part 20 and a stand 30. The first bench part 10 comprises: a lying board 11 and a frame 12 arranged on the bottom surface of the lying board 11. The bottom surface of the frame 12 is provided with a plurality of pillars 13, each pillar comprises a bolt 131 and a pad 132, but not limited thereto.

The second bench part 20 comprises: a lying board 21 and a frame 22 arranged on the bottom surface of the lying board 21. The frame 12 of the first bench part and the frame 22 of the second bench part are pivotally connected to each other on one side, so that the first bench part 10 and the second bench part 20 can be folded and stored or unfolded. The pillars 13 of the first bench part are set on the side away from the second bench part 20.

The stand 30 comprises: a pivot seat 31, a support column 32 and a support foot 33. The pivot seat 31 is arranged on the bottom surface of the second bench part 20, away from the end of the first bench part 10. The support column 32 is pivotally connected to the pivot seat 31, and the support foot 33 is connected to the support column 32. The support column 32 can swing relative to the pivot seat 31 between a folded position and an unfolded position. The support foot 33 is provided with a plurality of pillars 34, and each pillar 34 comprises a bolt 341 and a pad 342, but not limited thereto.

Figure 3:
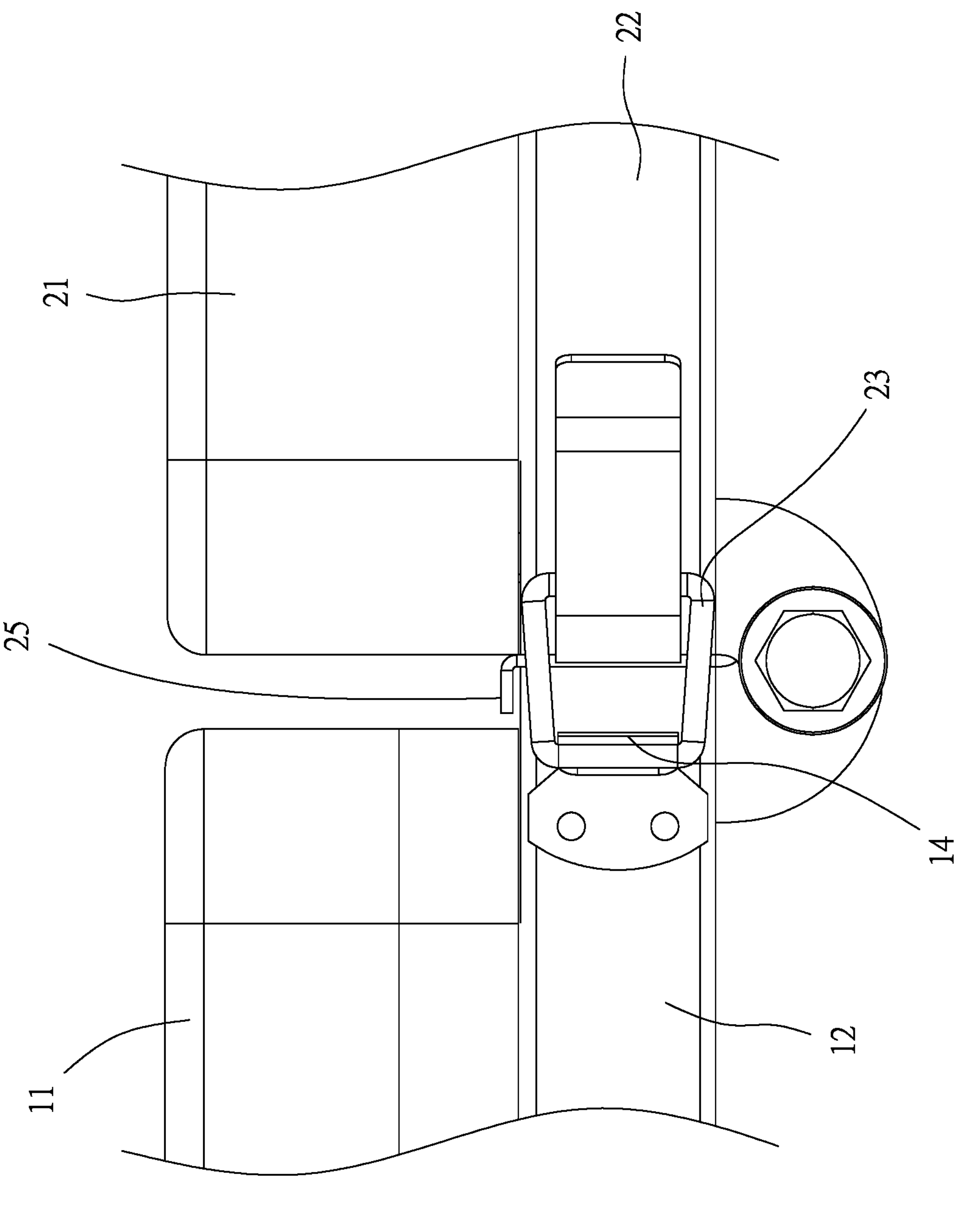
FIG. 3 is a partially enlarged schematic diagram of the present invention.
Figure 6:
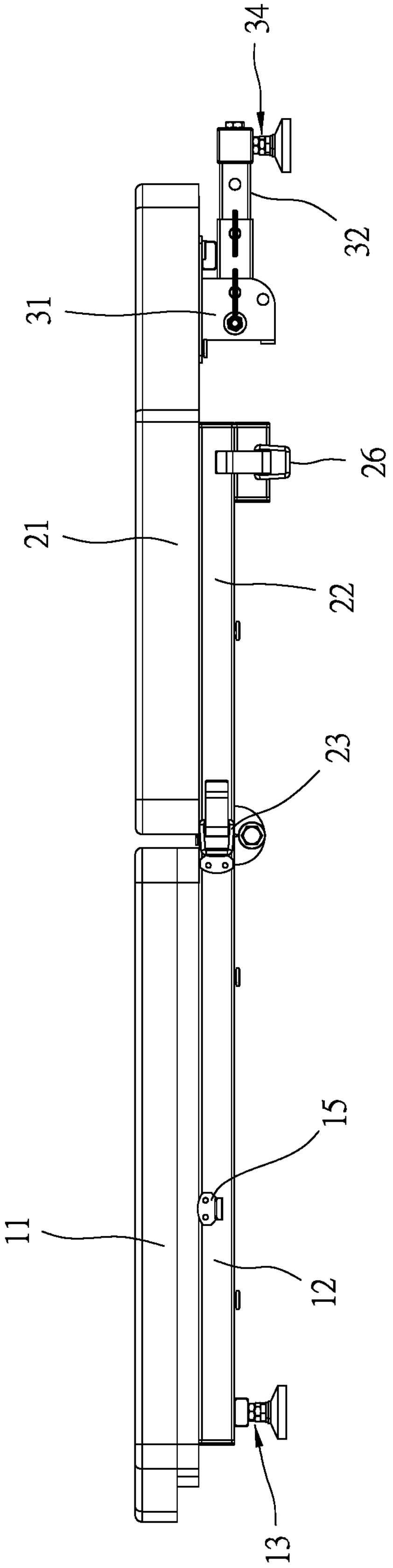
FIG. 6 is a schematic side view of the present invention when it is unfolded.

In order to enable the present invention to fix the positions of the first bench part 10 and the second bench part 20 when unfolding, a hook 14 is provided on one side of the frame 12 of the first bench part, and a buckle 23 is provided on the frame 22 of the second bench part 20 corresponding to the position of the hook 14. When the present invention unfolds the first bench part 10 and the second bench part 20 in a flattened state, the buckle 23 can be hooked to the hook 14 correspondingly, as shown in FIG. 3 and FIG. 6. And the frame 22 of the second bench part is protrudingly provided with a short wall 25 on the side adjacent to the first bench part frame 12. When the present invention is unfolded and the first bench part 10 and the second bench part 20 are flattened, the short wall 25 can touch the upper edge of the first bench part frame 12, so that the first bench part 10 and the second bench part 20 can have better mutual support and will not sag and deform.

Figure 4:
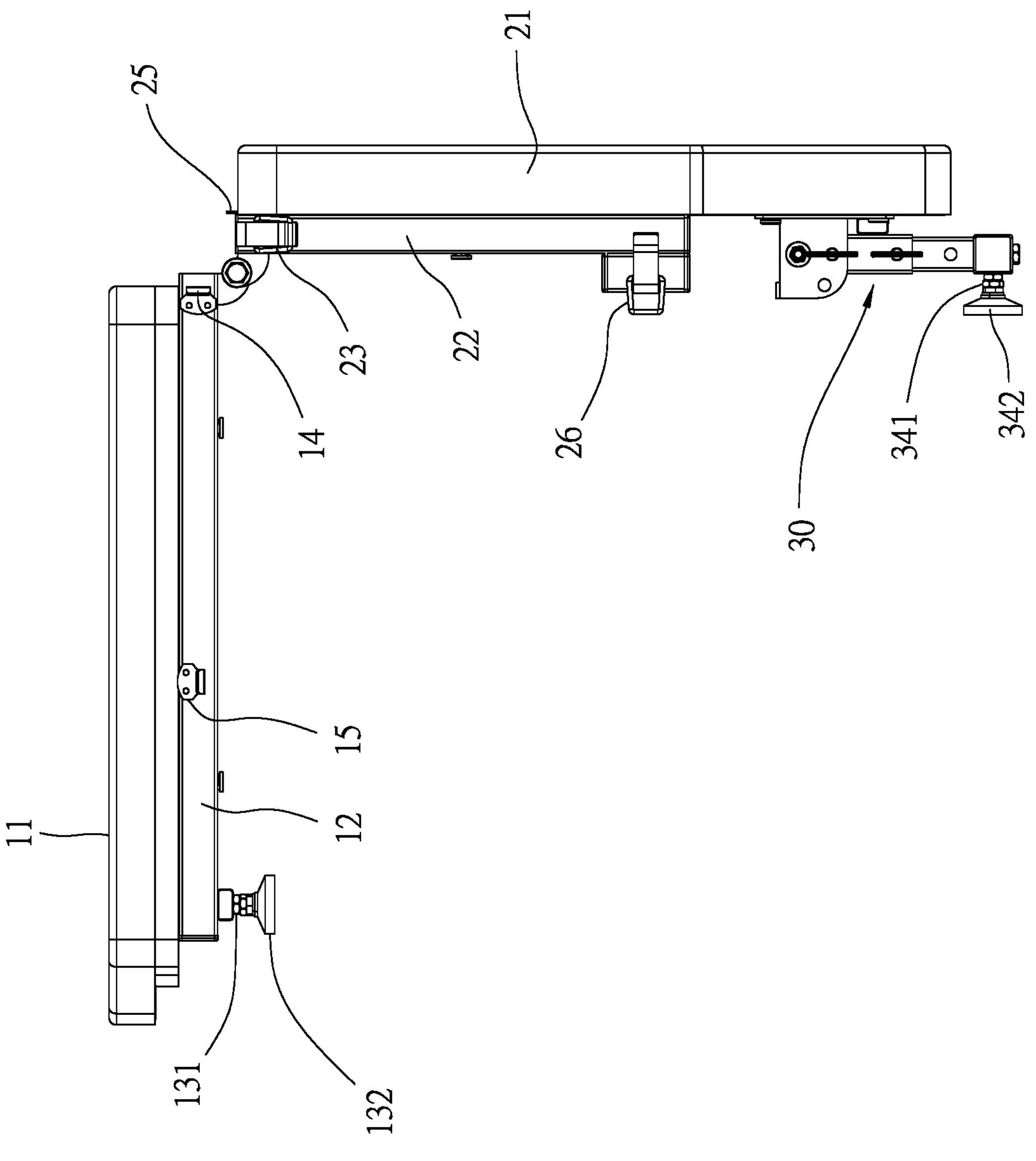
FIG. 4 is a schematic side view of the present invention when it is folded.
Figure 5:
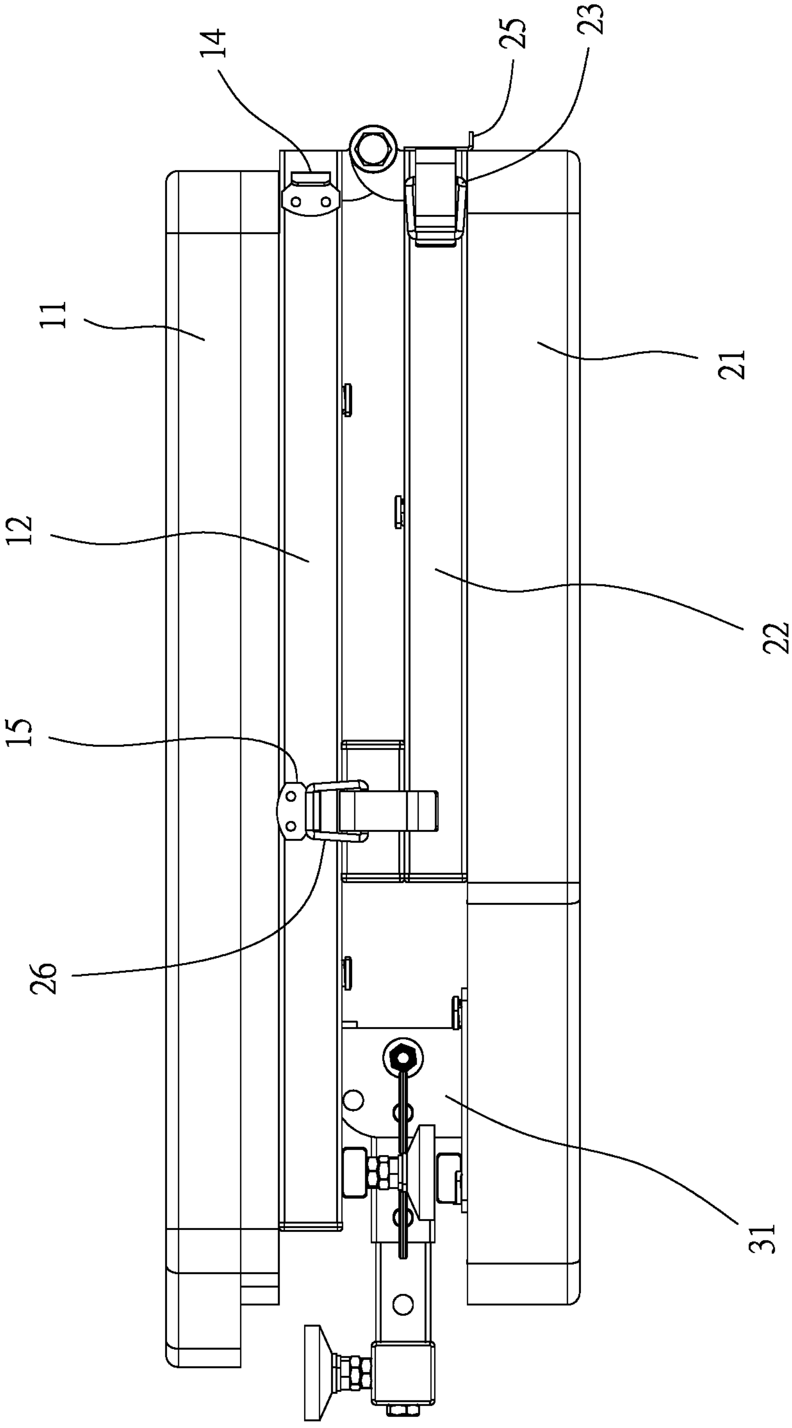
FIG. 5 is a schematic side view of the present invention after being folded.

With the above-mentioned structure, the present invention can be placed on a flat surface with the support of the pillars when the first bench part and the second bench part are unfolded in a flat state. When collapsing, the user only needs to untie the buckle 23 and fold the first bench part 10 and the second bench part 20. In order to make the present invention fixed and easy to move when it is folded, the first bench part is provided with a fixing member 15 at its frame 12, and the second bench part is provided with a ring hook 26 at the corresponding position of its frame 22. The first bench part and the second bench part can be fixed to each other in many ways, such as hook or snap, etc. In this embodiment, the fixing member 15 is a hook, as shown in FIG. 4 and FIG. 5, but not limited thereto. When the first bench part and the second bench part are folded close to each other, the ring hook 26 can be hooked on the fixing member 15 correspondingly, so as to fix and combine the first bench part and the second bench part.

Figure 7:
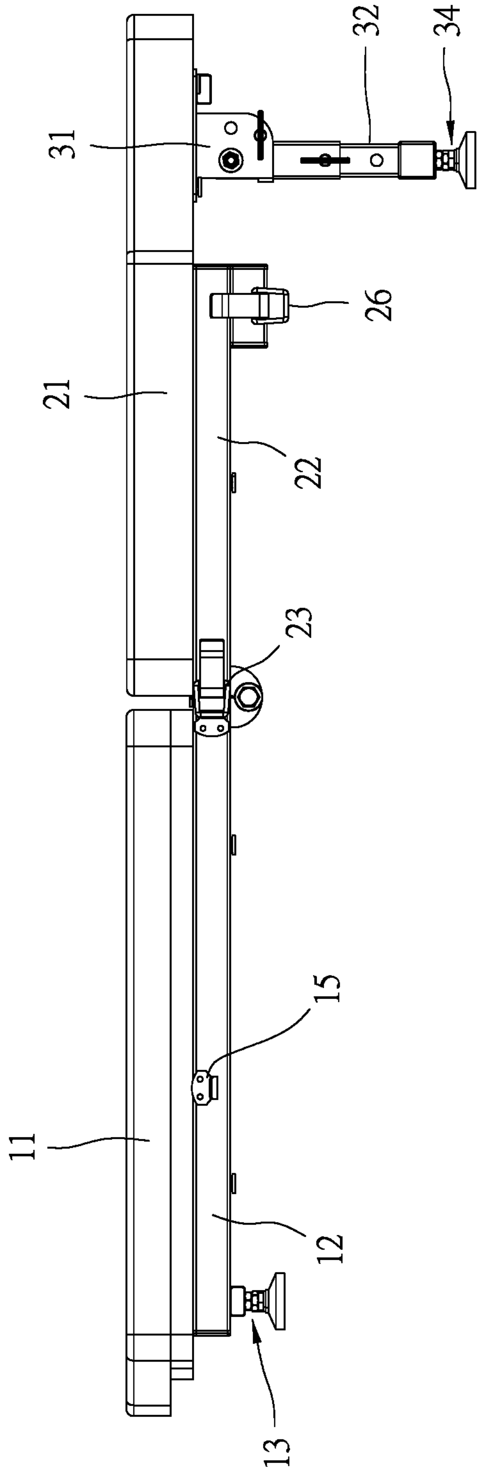
FIG. 7 is a side view of the stand of the present invention after it is bent downward.

As shown in FIG. 6 and FIG. 7, the foldable lying creeper of the present invention can fold the support column so that the first bench part and the second bench part can be used in the unfolded state, and the support column 32 can also be erected downward. At this time, the pillars 34 set on the support foot 33 need to be disassembled and then screwed to the other side of the support foot 33, so that the two ends of the foldable lying creeper have supports of different heights.

Figure 8:
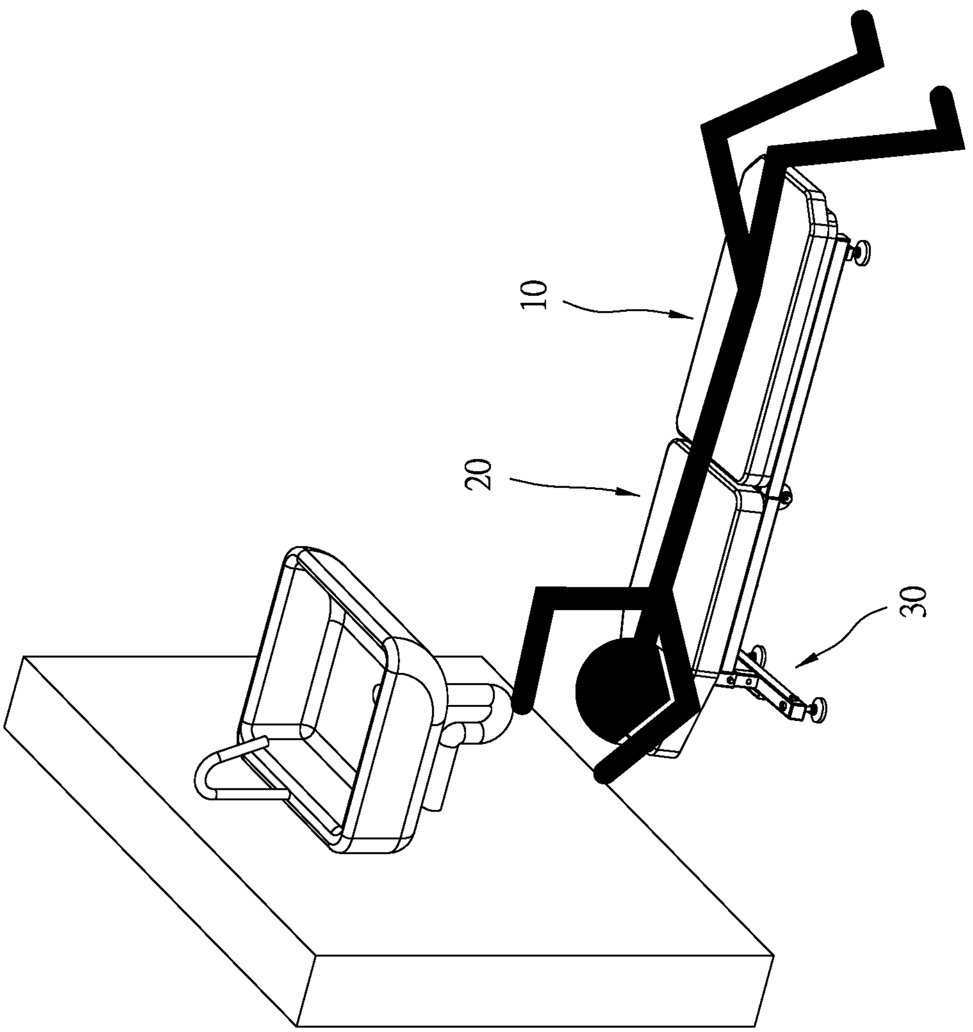
FIG. 8 is a schematic diagram of the present invention used in the maintenance of a bathroom washbasin.
Figure 9:
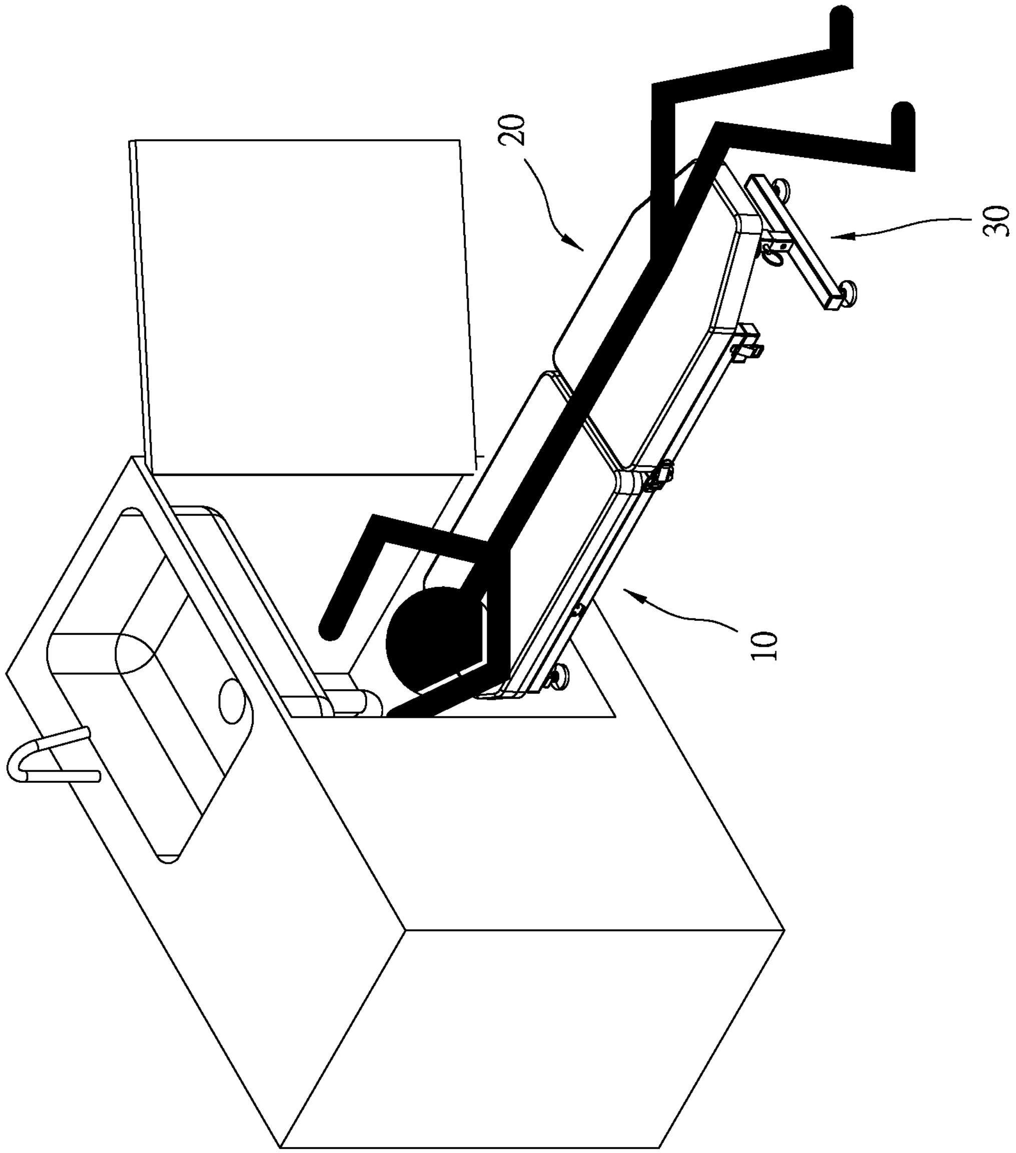
FIG. 9 is a schematic diagram of the present invention used in repairing a kitchen sink.

According to the aforementioned structure, the foldable lying creeper of the present invention can be used in many different forms. As shown in FIG. 8, it is the schematic state of the present invention when it is used to repair the bathroom washbasin. As shown in FIG. 9, it is the schematic state of the present invention when it is used to repair the kitchen sink.

Figure 10:
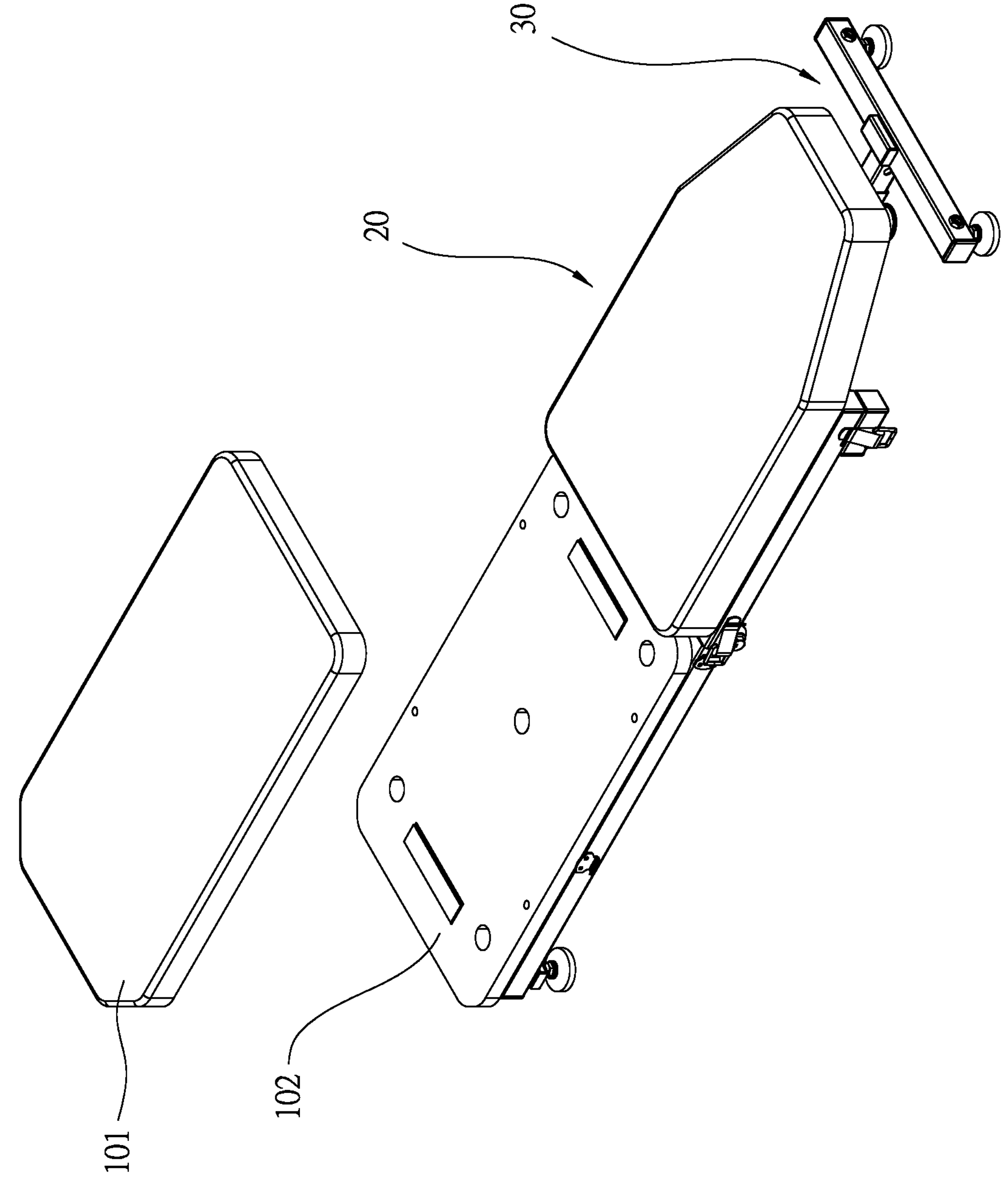
FIG. 10 is the other three-dimensional schematic diagram of the present invention.

Moreover, the first bench part 10 includes a pad 101 and a panel 102. Said pad 101 is detachable from the panel 102 of the first bench part 10 as shown in FIG. 10. In this embodiment, the pad 10 fastens on the panel 102 by hook and loop fastener. By this way, said pad 101 can be used as a pad to sit or to kneel separately.

What is claimed is:

1. A foldable lying creeper, comprising:

a first bench part comprising a lying board and a frame arranged on a bottom surface of the lying board of said first bench part, the frame of said first bench part being provided with a plurality of pillars at a bottom surface of one side thereof;

a second bench part comprising a lying board and a frame arranged on a bottom surface of the lying board of said second bench part, the frame of said first bench part and the frame of said second bench part being pivotally connected to each other on one side, so that said first bench part and said second bench part are capable of being folded and stored and thereafter unfolded and flattened for use, the frame of said second bench part being protruded with a short wall part at said one side thereof adjacent to said pivotal connection of the frame of said first bench part, so that when said first bench part and said second bench part are unfolded and flattened, said short wall part abuts an upper edge of the frame of said first bench part so that said first bench part and said second bench part can have better mutual support and will not sag and deform during use; and a stand comprising a pivot seat, a support column and a support foot, said pivot seat being arranged on a bottom surface of said second bench part away from said first bench part, said support column being pivotally connected to said pivot seat, said support foot being connected to said support column, said support column being swingable relative to said pivot seat between a folded position and an unfolded position.

2. The foldable lying creeper as claimed in claim 1, wherein the frame of said first bench part has one side thereof provided with a hook, and the frame of said second bench part is provided with a buckle at the position corresponding to said hook, so that said first bench part and said second bench part are unfolded and flattened, said buckle is correspondingly hooked to said hook.

3. The foldable lying creeper as claimed in claim 2, wherein the frame of said first bench part is further provided with a fixing member, and the frame of said second bench part is further provided with a ring hook at the position corresponding to said fixing member, so that when said first bench part and said second bench part are folded and close to each other, said ring hook is able to be hooked on the corresponding said fixing member.

4. The foldable lying creeper as claimed in claim 3, wherein said support foot is provided with at least one pillar, and said at least one pillar of said support foot comprises a bolt and a pad.

5. The foldable lying creeper as claimed in claim 1, wherein the frame of said first bench part is further provided with a fixing member, and the frame of said second bench part is further provided with a ring hook at the position corresponding to said fixing member, so that when said first bench part and said second bench part are folded and close to each other, said ring hook is able to be hooked on the corresponding said fixing member.

6. The foldable lying creeper as claimed in claim 5, wherein said support foot is provided with at least one pillar, and said at least one pillar of said support foot comprises a bolt and a pad.

7. The foldable lying creeper as claimed in claim 1, wherein said first bench part includes a pad and a panel, said pad is detachable from the panel.

* * * * *